US012429867B2

(12) United States Patent
Tamagawa

(10) Patent No.: US 12,429,867 B2
(45) Date of Patent: Sep. 30, 2025

(54) REMOTE CONTROL APPARATUS, DISPLAY CONTROL METHOD, AND NON-TRANSITORY COMPUTER READABLE RECORDING MEDIUM

(71) Applicant: TOYOTA JIDOSHA KABUSHIKI KAISHA, Toyota (JP)

(72) Inventor: Shuichi Tamagawa, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 18/464,549

(22) Filed: Sep. 11, 2023

(65) Prior Publication Data

US 2024/0118690 A1 Apr. 11, 2024

(30) Foreign Application Priority Data

Oct. 6, 2022 (JP) ................. 2022-161639

(51) Int. Cl.
*G05D 1/00* (2024.01)
*B60W 60/00* (2020.01)
*G06T 11/20* (2006.01)

(52) U.S. Cl.
CPC ......... *G05D 1/0038* (2013.01); *B60W 60/001* (2020.02); *G06T 11/203* (2013.01); *B60W 2420/403* (2013.01)

(58) Field of Classification Search
CPC .............. G05D 1/0038; B60W 60/001; B60W 2420/403; G06T 11/203
USPC ........................................................... 701/2
See application file for complete search history.

(56) References Cited

U.S. PATENT DOCUMENTS

| 11,215,982 | B2 | 1/2022 | Urano et al. | |
|---|---|---|---|---|
| 11,325,618 | B2 | 5/2022 | Umeda | |
| 2017/0188222 | A1* | 6/2017 | Cooper | H04W 24/08 |
| 2018/0074490 | A1* | 3/2018 | Park | G05D 1/0027 |
| 2019/0137999 | A1 | 5/2019 | Taguchi et al. | |
| 2020/0209888 | A1 | 7/2020 | Sakai et al. | |
| 2020/0310416 | A1* | 10/2020 | Matsunaga | G06F 3/147 |
| 2020/0326702 | A1 | 10/2020 | Iwamoto et al. | |

(Continued)

FOREIGN PATENT DOCUMENTS

| JP | 2021-018744 A | | 2/2021 |
|---|---|---|---|
| JP | 2022142323 A | * | 9/2022 |

*Primary Examiner* — Hunter B Lonsberry
*Assistant Examiner* — Helen Li
(74) *Attorney, Agent, or Firm* — Sughrue Mion, PLLC

(57) ABSTRACT

The present disclosure proposes a technique regarding a remote control apparatus for remotely driving or assisting a vehicle by communicating with the vehicle. The remote control apparatus comprises a display device and one or more processors. The one or more processors is configured to execute acquiring an image captured by a vehicle camera and traveling state information of the vehicle, displaying the image on the display device, predicting a position where the vehicle emergently stops when communication with the vehicle is lost based on the traveling state information, and displaying an object indicating the predicted position on the display device to be superimposed on the image. The displaying the object on the display device includes calculating a reliability of the communication with the vehicle, and changing an appearance of the object such that noticeability of the object is lower as the reliability is higher.

5 Claims, 6 Drawing Sheets

(56) References Cited

U.S. PATENT DOCUMENTS

| | | | |
|---|---|---|---|
| 2021/0027625 A1 | 1/2021 | Jung et al. | |
| 2021/0041894 A1 | 2/2021 | Urano et al. | |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |
| 2022/0189316 A1* | 6/2022 | Paul | G05D 1/0022 |
| 2022/0348183 A1* | 11/2022 | Malone | G05D 1/227 |

* cited by examiner

| COMMUNICATION RELIABILITY | Low | | | | High |
|---|---|---|---|---|---|
| COLOR | Yellow | Red | Blue | Purple | Blue-purple |

FIG. 4A

| COMMUNICATION RELIABILITY | Low | | | | High |
|---|---|---|---|---|---|
| LINE THICKNESS | Thick | | | | Thin |
| EXAMPLE | ⌒ | ⌒ | ⌒ | ⌒ | ⌒ |

FIG. 4B

| COMMUNICATION RELIABILITY | Low | | | | High |
|---|---|---|---|---|---|
| LINE TYPE | Solid | | | | Dotted |
| EXAMPLE | ⌒ | ⌒ | ⌒ | ⌒ | ⌒ |

FIG. 4C

REMOTE CONTROL APPARATUS, DISPLAY CONTROL METHOD, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2022-161639, filed Oct. 6, 2022, the contents of which application are incorporated herein by reference in their entirety.

BACKGROUND

Technical Field

The present disclosure relates to a technique for controlling display of a display device included in a remote control apparatus which remotely drives or assists a vehicle.

Background Art

In recent years, there has been conceived a technique for superimposing various information on an image regarding a vehicle displayed on a display device included in a remote control apparatus.

For example, Patent Literature 1 discloses an image display device including a determination unit determining a position of a vehicle at a future time point, a display unit displaying a monitoring image indicating surroundings of the vehicle, and a display control unit superimposing an object indicating the determined position of the vehicle at the future time point on the monitoring image.

LIST OF RELATED ART

Patent Literature 1: JP 2021/018744 A

SUMMARY

Generally, when the communication between the vehicle and the remote control apparatus is lost while the vehicle is being driven or assisted by the remote control apparatus, the vehicle performs an emergency stop to ensure safety. However, there is a possibility that the emergency stop cannot be safely performed depending on the traveling environment of the vehicle.

The inventor of the present disclosure considers superimposing information, that enables an operator to drive or assist the vehicle while assuming a case where communication is lost, on an image captured by a vehicle camera. It is desirable that the information be displayed sufficiently and clearly in view of the safety of the vehicle. However, if the information is always displayed sufficiently and clearly, the operator needs to drive or assist the vehicle while being aware of the information even in a situation where the possibility of communication lost is low. As a result, the usability of the remote control apparatus may be degraded, for example, other safety checks may be neglected.

In view of the above problem, an object of the present disclosure is to provide a technique that, while suppressing a decrease in the usability, enables the operator to drive or assist the vehicle while assuming a case where communication is lost.

A first disclosure is directed to a remote control apparatus for remotely driving or assisting a vehicle by communicating with the vehicle.

The remote control apparatus according to the first disclosure comprises:
 a display device; and
 one or more processors configured to execute:
  acquiring an image captured by a vehicle camera and traveling state information of the vehicle;
  displaying the image on the display device;
  predicting a position where the vehicle emergently stops when communication with the vehicle is lost based on the traveling state information; and
  displaying an object indicating the predicted position on the display device to be superimposed on the image,
 wherein the displaying the object on the display device to be superimposed on the image includes:
  calculating a reliability of the communication with the vehicle; and
  changing an appearance of the object such that noticeability of the object is lower as the reliability is higher.

A second disclosure is directed to a display control method for controlling display of a display device which is included in an apparatus remotely driving or assisting a vehicle by communicating with the vehicle.

The display control method according to the second disclosure comprises:
 acquiring an image captured by a vehicle camera and traveling state information of the vehicle;
 displaying the image on the display device;
 predicting a position where the vehicle emergently stops when communication with the vehicle is lost based on the traveling state information; and
 displaying an object indicating the predicted position on the display device to be superimposed on the image,
 wherein the displaying the object on the display device to be superimposed on the image includes:
  calculating a reliability of the communication with the vehicle; and
  changing an appearance of the object such that noticeability of the object is lower as the reliability is higher.

A third disclosure is directed to a computer program for controlling display of a display device which is included in an apparatus remotely driving or assisting a vehicle by communicating with the vehicle.

The computer program according to the third disclosure, when executed by a computer, cause the computer to execute:
 displaying the image on the display device;
 predicting a position where the vehicle emergently stops when communication with the vehicle is lost based on the traveling state information; and
 displaying an object indicating the predicted position on the display device to be superimposed on the image,
 wherein the displaying the object on the display device to be superimposed on the image includes:
  calculating a reliability of the communication with the vehicle; and
  changing an appearance of the object such that noticeability of the object is lower as the reliability is higher.

According to the present disclosure, the object indicating a position where the vehicle emergency stops (hereinafter, referred to as a "emergency stop position") when communication with the vehicle is lost is superimposed on the image displayed on the display device. It is thus possible to enable the operator to drive or assist the vehicle while ensuring safety assuming a case where communication is lost. Furthermore, according to the present disclosure, the appearance of the object indicating the emergency stop position is changed such that the higher the reliability of communication is, the lower the noticeability of the object is. It is thus possible to, in a case where the reliability of communication is sufficiently ensured and the possibility of communication lost is low, prevent the operator from being excessively conscious of the object indicating the emergency stop position. Then, it is possible to suppress a decrease in the usability caused by superimposing the object indicating the emergency stop position on the image.

BRIEF DESCRIPTION OF DRAWINGS

FIG. 4A is a conceptual diagram showing an example of changing appearance of an object depending on a reliability of communication;

FIG. 4B is a conceptual diagram showing an example of changing appearance of an object depending on the reliability of communication;

FIG. 4C is a conceptual diagram showing an example of changing appearance of an object depending on the reliability of communication;

DETAILED DESCRIPTION

Hereinafter, an embodiment will be described with reference to the drawings.

1. Configuration

Figure 1:
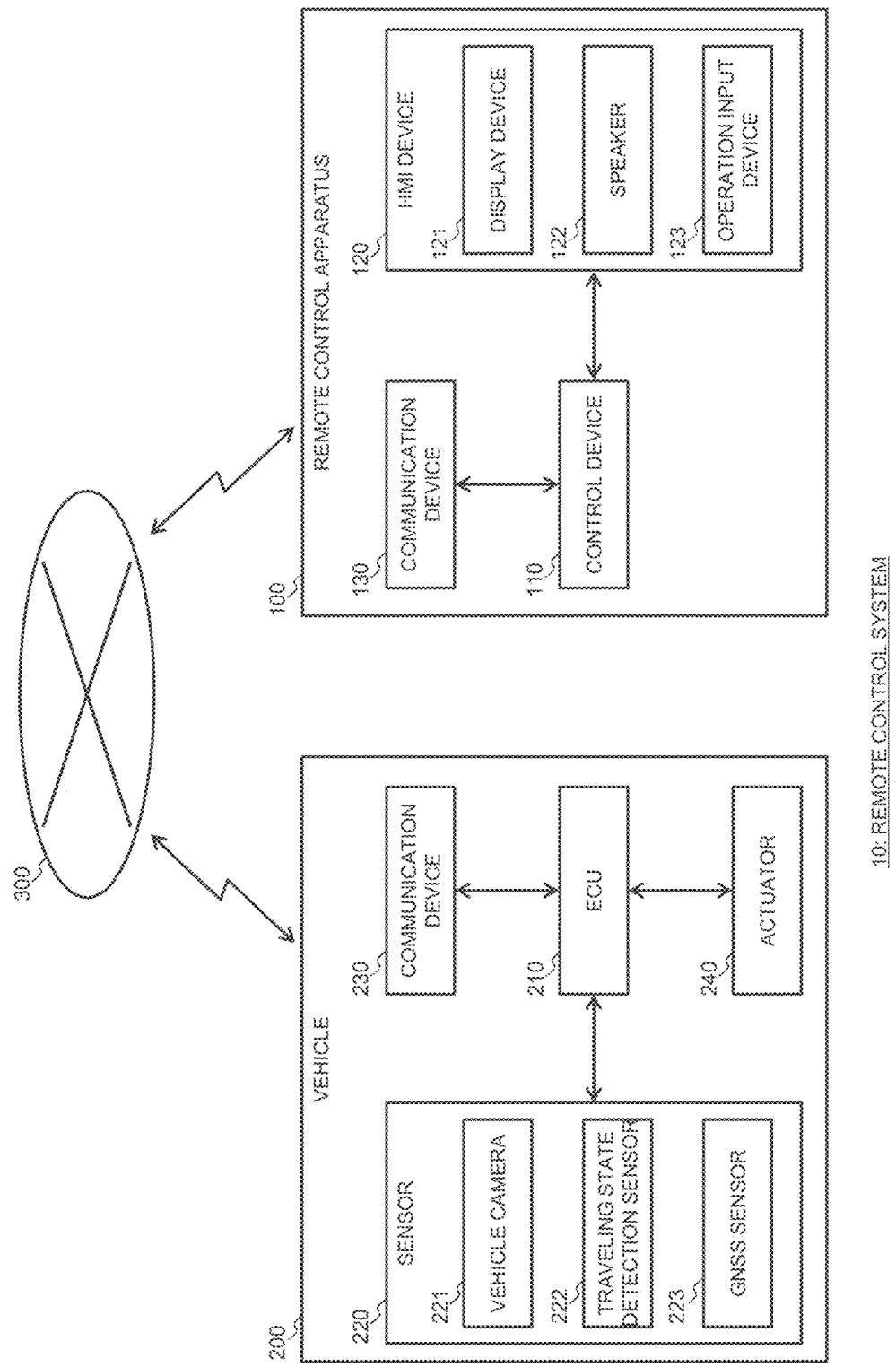
FIG. 1 is a block diagram showing a configuration of a remote control system according to the present embodiment.

FIG. 1 is a block diagram showing a configuration of a remote control system 10 according to the present embodiment. The remote control system 10 according to the present embodiment provides a function of remotely driving or remotely assisting the vehicle 200 (hereinafter, simply referred to as a "remote control function").

The function of remotely driving is typically a function of remotely performing at least one of operations related to running, turning, and stopping of the vehicle 200. For example, the remote control system 10 provides a function of remotely operating acceleration, deceleration, and steering of the vehicle 200. In this case, the vehicle 200 may be a vehicle that travels only by remote driving, or may be a vehicle driven by a driver or an autonomous vehicle capable of traveling by remote driving as necessary. The function of remotely assisting is typically a function of giving information related to a driving judgment or a recognition judgment to the vehicle 200. For example, the remote control system 10 provides a function of receiving, from the vehicle 200, a remote assistance request regarding whether or not the vehicle 200 can proceed or assistance for recognition, and receiving a judgment made by an operator. In this case, the vehicle 200 is typically an autonomous vehicle that issues the remote assistance request as needed.

The remote control system 10 includes a remote control apparatus 100. The remote control apparatus 100 communicates with the vehicle 200 through a communication network 300. The communication network 300 is configured of, for example, a mobile communication network including a plurality of base stations and the Internet. An operator of the vehicle 200 can remotely driver or assist the vehicle 200 by operating the remote control apparatus 100. The following will describe configurations of the remote control apparatus 100 and the vehicle 200.

The remote control apparatus 100 includes a control device 110, a HMI device 120, and a communication device 130.

The HMI device 120 provides a function regarding HMI (Human Machine Interface) to the operator of the vehicle 200. The HMI device 120 includes a display device 121, a speaker 122, and an operation input device 123. The operation input device 123 is a device that is operated by the operator and receives various inputs. For example, regarding the function of remotely driving, the operation input device 123 receives a driving operation by the operator. In this case, examples of the operation input device 123 include a gas pedal, a brake pedal, a steering wheel, and the like. And for example, regarding the function of remotely assisting, the operation input device 123 receives a judgment made by the operator. In this case, examples of the operation input device 123 include an operation panel, a keyboard, a switch, or the like.

In the remote control apparatus 100, it is considered that the operator recognizes traveling environment of the vehicle 200 from display of the display device 121 or sound of the speaker 122 and then operates the operation input device 123.

The control device 110 is connected to the HMI device 120 and the communication device 130 so as to transmit/receive information to/from each other. For example, the control device 110 is electrically connected to these devices by cables.

The control device 110 is a computer that executes processes regarding the remote control function. By executing the processes, the control device 110 transmits information of various inputs received by the operation input device 123 (hereinafter, simply referred to as "operation input information") to the vehicle 200 through the communication device 130. Furthermore, the control device 110 controls the display device 121 and the speaker 122 based on information regarding traveling environment (hereinafter, simply referred to as "traveling environment information") received from the vehicle 200 through the communication device 130.

The communication device 130 communicates with devices outside the remote control apparatus 100 to transmit/receive information. At least, the communication device 130 communicates with the vehicle 200 through the communication network 300. For example, the communication device 130 includes a device that connects to the Internet to transmit/receive information.

The vehicle 200 includes an Electronic Control Unit (ECU) 210, a sensor 220, a communication device 230, and an actuator 240.

The sensor 220 detects traveling environment of the vehicle 200. The sensor 220 includes a vehicle camera 221, a traveling state detection sensor 222, and a GNSS sensor 223.

The vehicle camera 221 captures an image of surrounding environment of the vehicle 200 including at least a front side. And the vehicle camera 221 outputs the captured image. The traveling state detection sensor 222 detects a traveling state (vehicle speed, acceleration/deceleration, yaw rate, or the like) of the vehicle 200. And the traveling state detection sensor 222 outputs information of the detected traveling state (hereinafter, referred to as "traveling state information"). Examples of the traveling state detection sensor 222 include a wheel speed sensor, an accelerometer, a gyroscope, and an IMU (Internal Measurement Unit). GNSS (Global Navigation Satellite System) sensor 223 measures the position of the vehicle 200 by receiving a signal from a satellite. And the GNSS sensor 223 outputs information of the received position (hereinafter, referred to as "GNSS position information").

The ECU 210 is connected to the sensor 220, the communication device 230, and the actuator 240 so as to transmit/receive information to each other. Typically, the ECU 210 is connected to these devices via an in-vehicle network configured of a control area network (CAN) or the like.

The ECU 210 transmits detection information of the sensor 220 as the traveling environment information to the remote control apparatus 100 through the communication device 230.

The ECU 210 also executes a process for controlling the vehicle 200 and generates control signals. At least, the ECU 210 executes a process of controlling the vehicle 200 depending on the operation input information received from the remote control apparatus 100 through the communication device 230. For example, regarding the function of remotely driving, the ECU 210 generates a control signal commanding acceleration, braking, or steering depending on an operation amount of the driving operation (accelerator position amount, brake pedal depression amount, steering angle, or the like) received as the operation input information. And for example, regarding the function of remotely assisting, the ECU 210 performs autonomous driving of the vehicle 200 depending on a judgment of the operator received as the operation input information.

Furthermore, the ECU 210 is configured to execute a process of performing an emergency stop of the vehicle 200 when communication with the remote control apparatus 100 is lost while the vehicle 200 is being driven or assisted by the remote control apparatus 100. For example, when the communication with the remote control apparatus 100 is lost, the ECU 210 makes the vehicle 200 stop emergently at a predetermined deceleration.

The communication device 230 communicates with devices outside the vehicle 200 to transmit/receive information. At least, the communication device 230 communicates with the remote control apparatus 100 through the communication network 300. For example, the communication device 230 includes a device that communicates with a base station located around the vehicle 200 to transmit/receive information.

The actuator 240 operates depending on control signals generated by the ECU 210. By the actuator 240 operating depending on the control signals acquired from the ECU 210, the driving or assisting of the vehicle 200 by the remote control apparatus 100 is realized.

Figure 2:
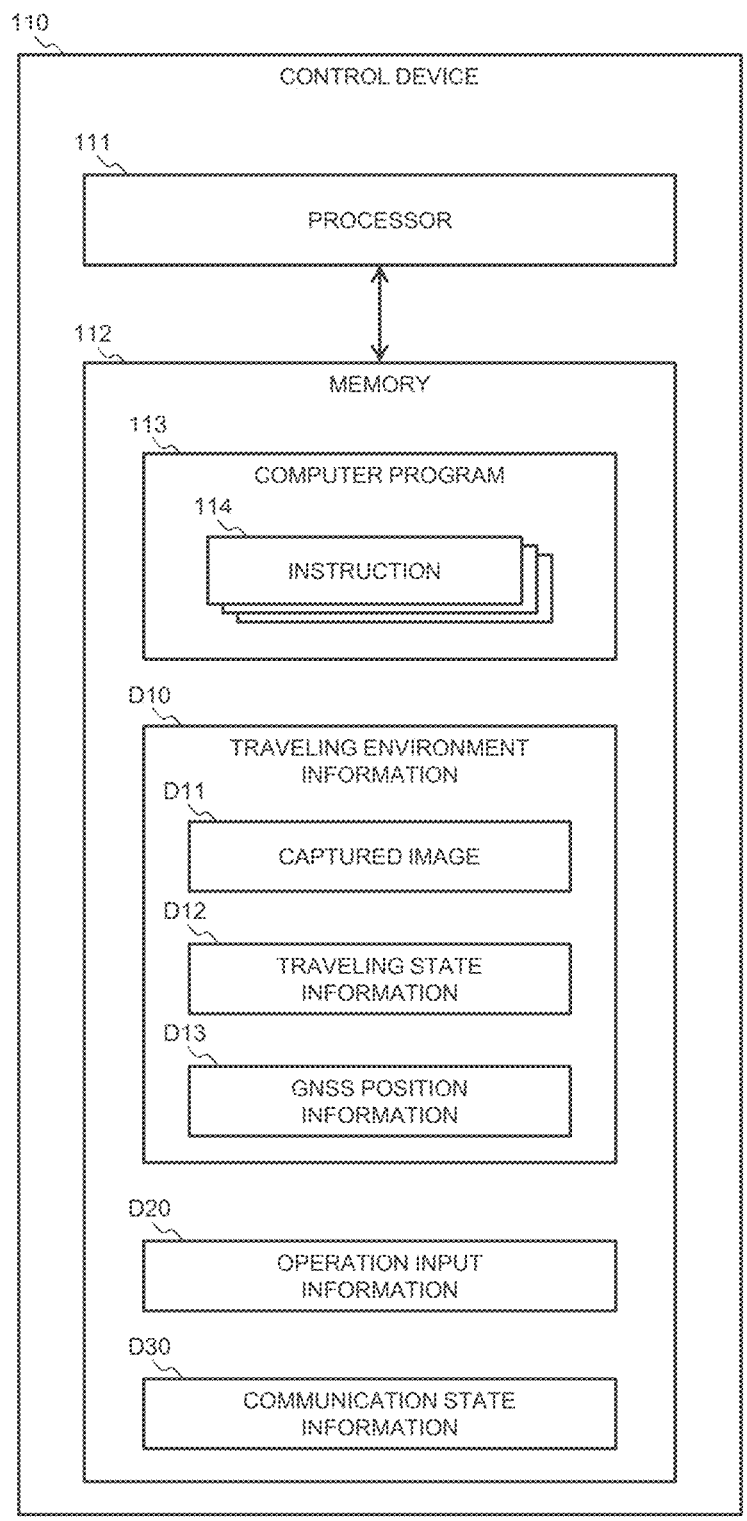
FIG. 2 is a block diagram showing a configuration of a control device according to the present embodiment.

The following will describe a configuration of the control device 110 included in the remote control apparatus 100 with reference to FIG. 2. FIG. 2 is a block diagram showing an example of the configuration of the control device 110.

The control device 110 includes one or more processors 111 (hereinafter, simply referred to as "processor 111") and one or more memories 112 (hereinafter, simply referred to as "memory 112"). The processor 111 executes various processes. The processor 111 can be configured by, for example, a central processing unit (CPU) including an arithmetic unit, a register, and the like. The memory 112 is coupled to the processor 111 and stores various information required for the processor 111 to execute processes. The memory 112 is a recording medium such as a read only memory (ROM), a random access memory (RAM), a hard disk drive (HDD), or a solid state drive (SSD), for example.

The memory 112 stores instructions 114, traveling environment information D10, operation input information D20, and communication state information D30.

The instructions 114 are provided by the computer program 113. By the processor 111 operating in accordance with the instructions 114, execution of various processes by the control device 110 is realized. The computer program 113 may be recorded on a non-transitory computer-readable recording medium included in the memory 112.

The traveling environment information D10 is received from the vehicle 200. The operation input information D20 is acquired from the operation input device 123. The traveling environment information D10 includes a captured image D11 of the vehicle camera 221, traveling state information D12, and GNSS position information D13. Furthermore, the traveling environment information D10 may include the predetermined deceleration when the vehicle 200 performs the emergency stop, specification information (installation position, installation angle, angle of view, and the like) of the vehicle camera 221 included in the vehicle 200, and the like.

The communication state information D30 is information regarding a communication state between the remote control apparatus 100 and the vehicle 200. Examples of the communication state information D30 include communication throughput and latency measured at any time, map information in which communication states (base-station installation states and communication strengths for respective communication carriers) are associated at respective positions on a map, and maintenance and failure information for respective communication carriers. The communication state information D30 is acquired by, for example, the processor executing a process. Alternatively, the remote control apparatus 100 may receive the communication state information D30 from various servers through the communication network 300.

2. Stop Position Display Process

The control device 110 (more specifically, the processor 111) executes at least a process of displaying the captured image D11 on the display device 121 in processing for controlling the display device 121. Furthermore, the processor 111 executes a process (stop position display process) of displaying an object indicating a position of the vehicle 200 when the communication with the vehicle 200 is lost (emergency stop position) on the display device 121 so as to be superimposed on the captured image D11.

Hereinafter, the stop position display process executed by the processor 111 will be described.

First, the processor 111 predicts the emergency stop position of the vehicle 200 based on the traveling state information D12. For example, the processor 111 predicts the emergency stop position of the vehicle 200 from the vehicle speed and the steering angle of the vehicle 200 and the predetermined deceleration for the emergency stop the vehicle performs. The emergency stop position is represented by, for example, a relative position from the vehicle 200 in the spatial coordinate system.

Next, the processor 111 displays the object indicating the predicted emergency stop position on the display device 121 so as to be superimposed on the captured image D11. For example, the processor 111 converts the predicted emergency stop position into a position on image coordinates of the captured image D11 based on the specification information of the vehicle camera 221. And then, the processor 111 displays the object at the position on the image coordinates of the captured image D11.

Figure 3:
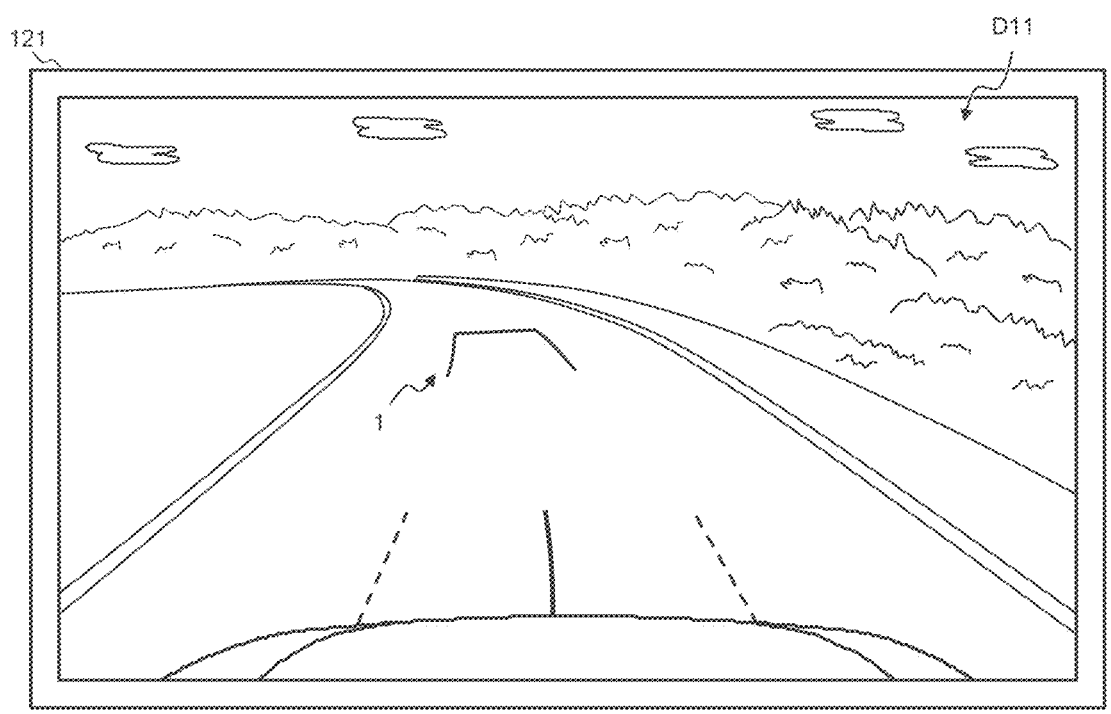
FIG. 3 is a conceptual diagram showing an example of display of a display device.

FIG. 3 shows an example of display on the display device 121 when the processor 111 executes the stop position display processing in the present embodiment. As shown in FIG. 3, an object 1 indicating the emergency stop position of the vehicle 200 is displayed on the display device 121 so as to be superimposed on the captured image D11. Such a display is one of augmented reality (AR) displays. By displaying the object 1 so as to be superimposed on the captured image D11 as shown in FIG. 3, it is possible to enable the operator of the vehicle 200 to drive or assist the vehicle 200 while ensuring safety assuming a case where communication is lost. For example, the operator can drive or assist the vehicle 200 so that the object 1 does not deviate from the road.

Although the object 1 is configured by a plurality of lines in FIG. 3, the object 1 may employ other configurations. For example, the object 1 may be a circular or rectangular region, a three-dimensional shape imitating the vehicle 200, or the like. In the following description, it is assumed that the object 1 is configured by a plurality of lines.

In the stop position display process, the processor 111 further calculates reliability of communication between the remote control apparatus 100 and the vehicle 200 (hereinafter, simply referred to as "communication reliability"). Then, the processor 111 changes the appearance of the object 1 such that noticeability of the object 1 is lower as the communication reliability is higher.

The calculation of the communication reliability can be performed as follows based on the communication state information D30. One is to use communication throughput or latency, which are measured as needed, as an index. For example, the processor 111 is configured to calculate the communication reliability to be higher as the communication throughput is higher and as the communication latency is lower. The other one is to use the map information with which the communication states are associated. For example, the processor 111 is configured to calculate the communication reliability by specifying the position of the vehicle 200 from the GNSS position information D13 and acquiring the communication state at the specified position from the map information. The processor 111 may be configured to adjust the communication reliability based on a time zone, maintenance and failure information for respective communication carriers, and the like.

The changing appearance of the object 1 such that the noticeability of the object 1 is lower as the communication reliability is higher can be performed, for example, as shown in FIGS. 4A, 4B, and 4C. FIGS. 4A, 4B and 4C show three patterns of the changing the appearance of the object 1 depending on the communication reliability.

FIG. 4A shows a pattern of changing the color of the object 1 depending on the communication reliability. It is known that noticeability of color when the background is gray increased in the order of blue-purple, purple, blue, red, and yellow. In addition, the object 1 is usually displayed on a road portion in the captured image D11, and the road portion generally has strongly a gray color. Therefore, by changing the color of the object 1 as shown in FIG. 4A, it is possible to change the appearance of the object 1 such that the noticeability of the object 1 is lower as the reliability is higher. The processor 111 may be configured to switch the color changing pattern depending on the communication reliability in accordance with the color of the display portion of the captured image D11 in which the object 1 is displayed.

FIG. 4B shows a pattern of changing the thickness of the plurality of lines configuring the object 1 depending on the communication reliability. As shown in FIG. 4B, by making the plurality of lines thinner as the communication reliability is higher, it is possible to change the appearance of the object 1 such that the noticeability of the object 1 is lower as the reliability is higher.

FIG. 4C shows a pattern of changing the line type of the plurality of lines configuring the object 1 depending on the communication reliability. In general, a line with more solid line portions is more noticeability. Therefore, by changing the line type of the plurality of lines configuring the object 1 as shown in FIG. 4C, it is possible to change the appearance of the object 1 such that noticeability of the object 1 is lower as the reliability is higher.

Figure 5A:
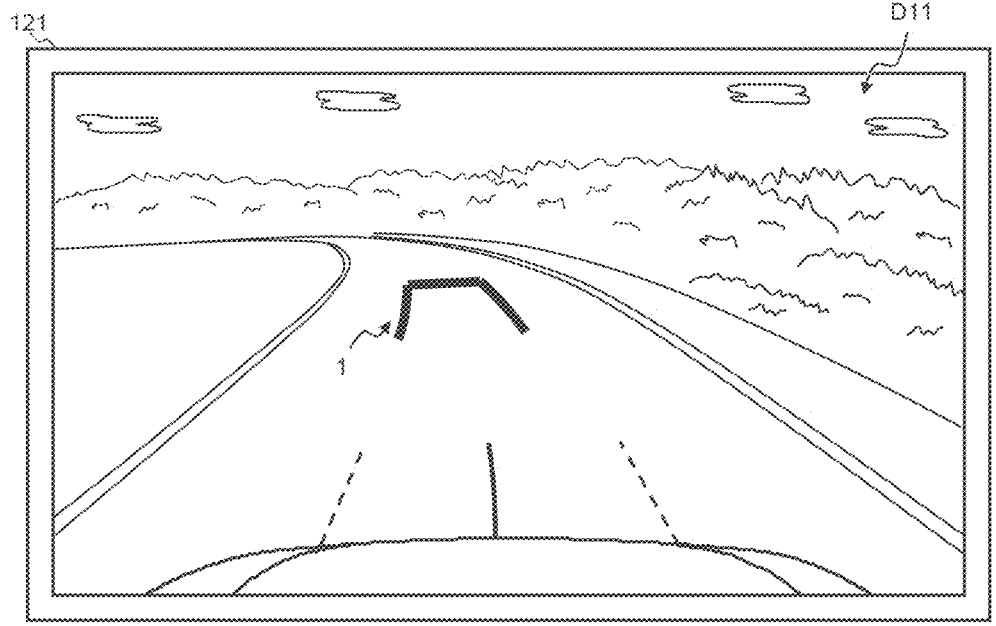
FIG. 5A is a conceptual diagram showing a practical example by the present embodiment.

Each pattern may be combined. For example, the processor 111 may be configured to change both the line thickness and the line type of the plurality of lines configuring the object 1 depending on the communication reliability. FIG. 5A shows a practical example by the present embodiment in a case where the communication reliability is low (Case of Low Communication Reliability). And FIG. 5B shows a practical example by the present embodiment in a case where the communication reliability is high (Case of High Communication Reliability).

Figure 5B:
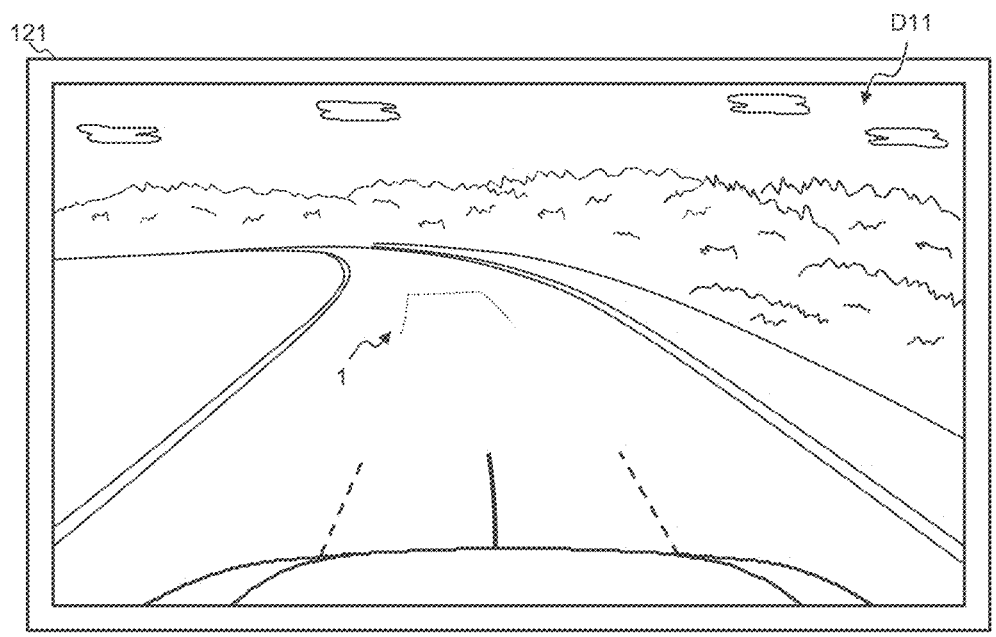
FIG. 5B is a conceptual diagram showing a practical example by the present embodiment.

As can be seen from FIGS. 5A and 5B, by changing the appearance of the object 1 such that the noticeability of the object 1 is lower as the reliability is higher, it is possible to prevent the operator from being excessively conscious of the object 1 when the communication reliability is sufficiently ensured and the possibility of communication lost is low. Then, it is possible to suppress a decrease in the usability of the remote control apparatus 100 caused by superimposing the object 1 on the captured image D11. Furthermore, when the communication reliability is low and there is a risk of communication lost, the object 1 is sufficiently and clearly displayed in the display device 121. Then, it is possible to encourage the operator to drive or assist the vehicle 200 with awareness of the object 1 when there is a risk of communication lost. And it is possible to improve the safety of the remote control function.

It is not desirable to make the emergency stop position completely unrecognizable from the viewpoint of ensuring safety. Therefore, even if the communication reliability is sufficiently high, it is desirable not to turn off the display of the object 1.

Figure 6:
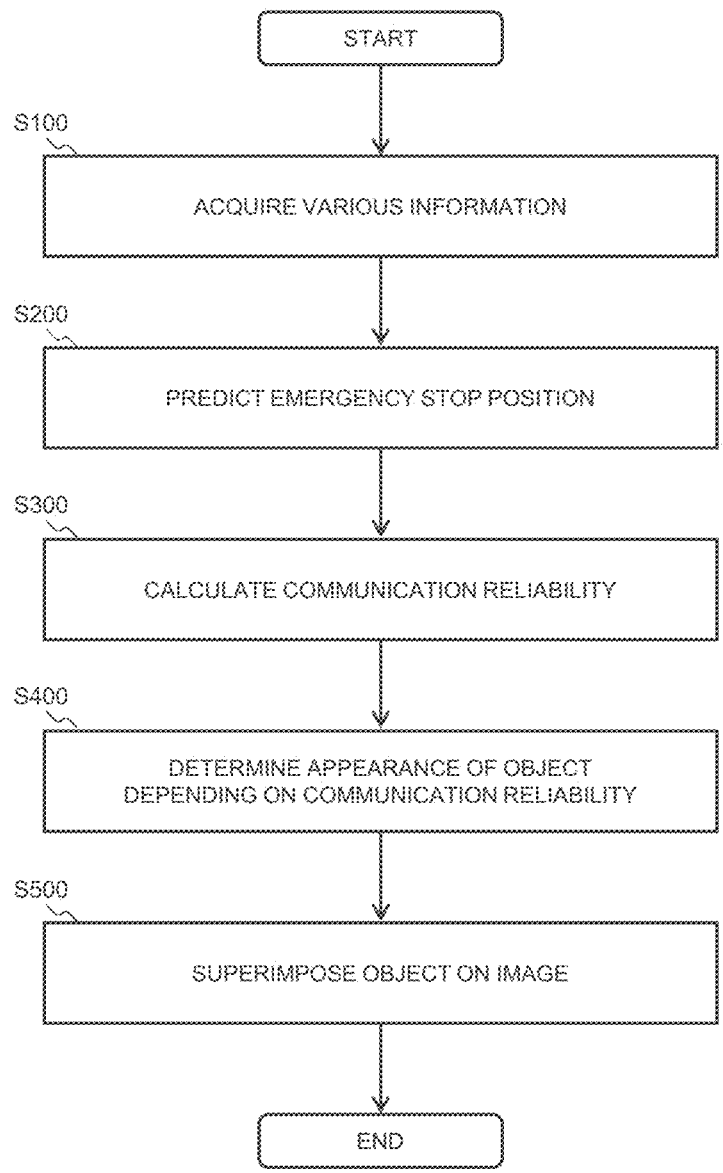
FIG. 6 is a flowchart showing an example of a process executed by one or more processors.

FIG. 6 is a flowchart showing an example of the stop position display process executed by the processor 111. The flowchart shown in FIG. 6 may be repeatedly executed at predetermined intervals.

In step S100, the processor 111 acquires various information stored in the memory 112.

In step S200, the processor 111 predicts a position of the vehicle 200 when the communication between the remote control apparatus 100 and the vehicle 200 is lost (emergency stop position) based on the traveling state information D12.

In step S300, the processor 111 calculates a reliability of communication (communication reliability) between the remote control apparatus 100 and the vehicle 200 based on the communication state information D30.

In step S400, the processor 111 determines the appearance of the object 1 depending on the communication reliability calculated in step S300. Here, the processor 111 determines the appearance of the object 1 such that the noticeability of the object 1 is lower as the communication reliability is higher.

In step S500, the processor 111 displays the object 1 indicating the emergency stop position predicted in step S200 with the appearance determined in step S400 on the display device 12 to be superimposed on the captured image D11

In this way, the processor 111 executes the stop position display process. In addition, by the processor 111 executing the stop position display process as described above, a display control method for controlling the display of the display device 121 is realized.

What is claimed is:

1. A remote control apparatus for remotely driving or assisting a vehicle by communicating with the vehicle, the apparatus comprising:
   a display device; and
   one or more processors configured to execute:
      acquiring an image captured by a vehicle camera and traveling state information of the vehicle;
      displaying the image on the display device;
      predicting a position where the vehicle emergently stops when communication with the vehicle is lost based on the traveling state information; and
      displaying an object indicating the predicted position on the display device to be superimposed on the image,
   wherein the displaying the object on the display device to be superimposed on the image includes:
   calculating a reliability of the communication with the vehicle; and
   changing an appearance of the object such that noticeability of the object is lower as the reliability is higher.

2. The remote control apparatus according to claim 1, wherein the changing the appearance of the object includes changing a color of the object to one whose noticeability with respect to a display portion in which the object is displayed is lower as the reliability is higher.

3. The remote control apparatus according to claim 1, wherein the object is configured by a plurality of lines, and
the changing the appearance of the object includes at least one of:
   making the plurality of lines thinner as the reliability is higher; and
   changing a line type of the plurality of lines to one whose noticeability is lower as the reliability is higher.

4. A display control method for controlling display of a display device which is included in an apparatus remotely driving or assisting a vehicle by communicating with the vehicle, the method comprising:
   acquiring an image captured by a vehicle camera and traveling state information of the vehicle;
   displaying the image on the display device;
   predicting a position where the vehicle emergently stops when communication with the vehicle is lost based on the traveling state information; and
   displaying an object indicating the predicted position on the display device to be superimposed on the image,
   wherein the displaying the object on the display device to be superimposed on the image includes:
   calculating a reliability of the communication with the vehicle; and
   changing an appearance of the object such that noticeability of the object is lower as the reliability is higher.

5. A non-transitory computer readable recording medium on which a computer program for controlling display of a display device which is included in an apparatus remotely driving or assisting a vehicle by communicating with the vehicle is recorded,
   the computer program, when executed by a computer, causing the computer to execute:
   acquiring an image captured by a vehicle camera and traveling state information of the vehicle;
   displaying the image on the display device;
   predicting a position where the vehicle emergently stops when communication with the vehicle is lost based on the traveling state information; and
   displaying an object indicating the predicted position on the display device to be superimposed on the image,
   wherein the displaying the object on the display device to be superimposed on the image includes:
   calculating a reliability of the communication with the vehicle; and
   changing an appearance of the object such that noticeability of the object is lower as the reliability is higher.

* * * * *